No. 662,348. Patented Nov. 20, 1900.
J. W. BRYSON & J. A. EVARTS.
TRANSFER TABLE FOR ROLLING MILLS.
(Application filed Aug. 3, 1900.)
(No Model.)
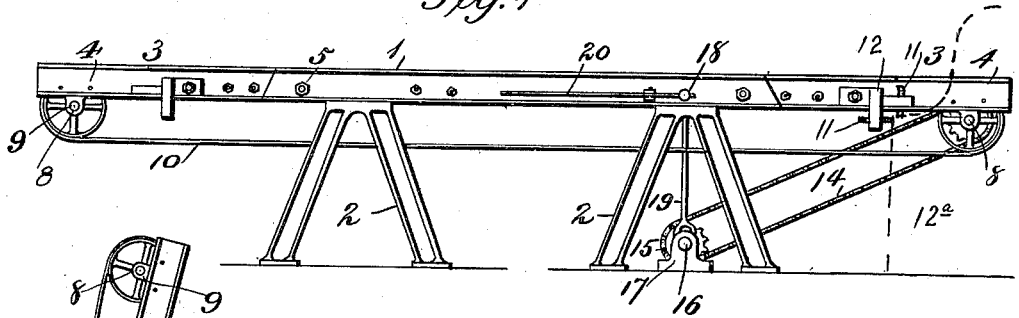
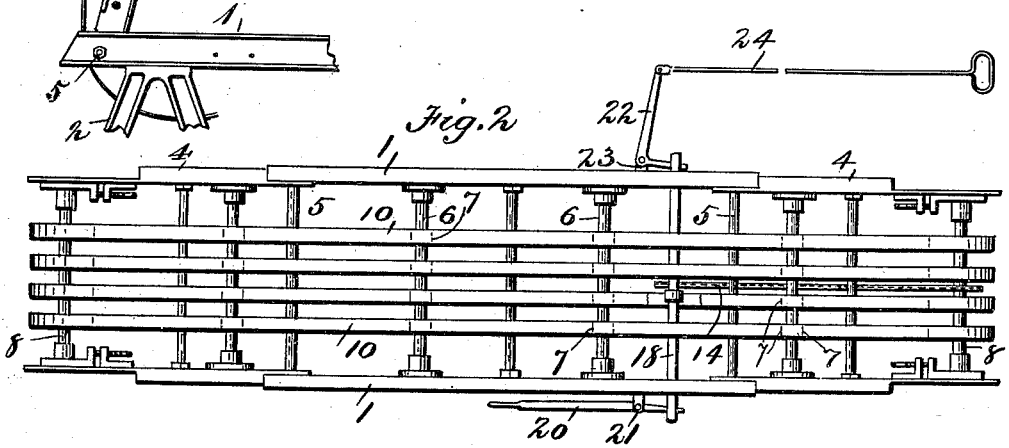
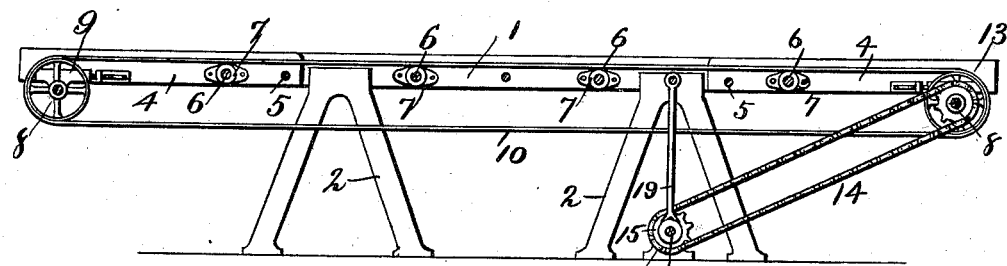
Witnesses
Franck L. Ouzand
_____
Inventors:
James W. Bryson.
James A. Evarts,
By Louis Bagger & Co.,
Attorneys.

UNITED STATES PATENT OFFICE.

JAMES W. BRYSON AND JAMES A. EVARTS, OF NEW CASTLE, PENNSYLVANIA.

TRANSFER-TABLE FOR ROLLING-MILLS.

SPECIFICATION forming part of Letters Patent No. 662,348, dated November 20, 1900.

Application filed August 3, 1900. Serial No. 25,785. (No model.)

*To all whom it may concern:*

Be it known that we, JAMES W. BRYSON and JAMES A. EVARTS, citizens of the United States, residing at New Castle, in the county of Lawrence and State of Pennsylvania, have invented new and useful Improvements in Transfer-Tables for Rolling-Mills, of which the following is a specification.

Our invention relates to transfer-tables or conveyers for cold-rolling mills; and one object of the same is to provide simple and efficient means for conveying steel or iron sheets from one set of rollers to another or from one part of the mill to another; and another object is to provide means for swinging the ends of the table up out of the way when it is desired to gain access to the rollers of the mill at either end of the transfer-table. We attain these objects by means of the construction illustrated in the accompanying drawings, which form a part of this specification, and in which—

Figure 1 is a side view of a machine embodying our invention. Fig. 2 is a plan view thereof. Fig. 3 is a side view showing one end of the table or conveyer thrown up to give access to the rollers and other parts of the mill. Fig. 4 is a longitudinal section of our device.

Like numerals of reference designate like parts wherever they occur in the different views of the drawings.

As shown in the drawings, the framework of our transfer-table or conveyer may be channel-beams, and the numeral 1 designates the horizontal bars of the table supported upon the divergent legs 2, which are securely bolted to the floor of the mill-building. The opposite ends 3 of the table are also formed of channel-beams 4 and are hinged to the bars 1 by the cross-rods 5. Journaled at intervals in the horizontal bars 1 and in the hinged ends 3 of the table are the shafts 6, and each shaft has secured thereto a series of pulleys 7, there being four such pulleys on each shaft, as shown in the drawings; but any suitable number may be employed. Near the outer ends of the hinged end sections 3 shafts 8 are journaled in hangers 9, depending from the beams 4, and each of these shafts has a series of large pulleys secured thereto, the upper peripheries of said pulleys being in horizontal alinement with the upper peripheries of the pulleys 7 and all the pulleys being in longitudinal alinement. Belts 10 pass around the pulleys and form an endless apron or conveyer for the metal sheets as they emerge from the rollers of one mill, and said conveyer carries the sheets to the next set of rollers and automatically feeds the sheets between the rollers. To adjust the height of the end sections to the desired degree to insure the proper feed of the plates to the rollers, any suitable adjusting means may be employed, that shown consisting of a system of set-screws 11, passing through a support 12, which screws bear against the housing 12ª of the rollers. A sprocket-wheel 13, keyed to one of the end shafts 8, is connected by a sprocket-chain 14 to a small sprocket-wheel 15 on the driving-shaft 16, journaled in bearings 17, bolted to the floor of the building. The shaft 16 is driven from any suitable source of power and at the required speed to give the conveyer the requisite travel, which of course may be varied for different classes of work. A shifting device may be employed for starting and stopping the travel of the belts 10. As shown, this device consists of a sliding rod 18, loosely fitted to the beams 1 and carrying a yoke or spanner 19, connected to the sprocket-wheel 15 on the shaft 16. A lever 20 is secured to one end of the sliding rod 18 and is fulcrumed on a stud 21, secured to one of the beams 1. The opposite end of the rod 18 has an elbow-lever 22 pivoted thereto, said elbow-lever being fulcrumed on a stud 23 and the long arm of said elbow-lever having a connecting-rod 24 attached thereto and provided at its end with an operating-handle.

It will be understood from the foregoing that we may use a number of the transfer-tables or conveyers in the rolling-mill for carrying the sheets from one set of rollers to another and for conveying the finished plates to a place of storage. Whenever it is found necessary to gain access to the rollers of the mill for polishing them or for repairs, the end sections 3 of the table may be swung up out of the way, as shown in Fig. 3 of the drawings. This feature of our invention is particularly desirable in a conveyer of this character, as it permits access to the rollers without moving the entire table, and as the end sections 3 may be swung up in a moment much time is saved in this operation.

Having thus fully described our invention, what we claim is—

In a transfer-table for rolling-mills, a pair of horizontal beams, a series of shafts journaled therein and each carrying a plurality of pulleys, belts passing over the pulleys, said belts being constructed to bear the metal and end sections hinged to the ends of the table and carrying the end pulleys for the belts, substantially as described.

In testimony whereof we have hereunto set our hands in presence of two subscribing witnesses.

JAMES W. BRYSON.
JAMES A. EVARTS.

Witnesses:
CHAS. E. MEHARD,
E. L. KNESAL.